United States Patent [19]

Martinelli

[11] 3,774,440

[45] Nov. 27, 1973

[54] INSTRUMENT FOR DETERMINING POLYMER DEFLECTION TEMPERATURES

[75] Inventor: Fred J. Martinelli, Menlo Park, Calif.

[73] Assignee: Stanford Research Institute, Menlo Park, Calif.

[22] Filed: Jan. 10, 1972

[21] Appl. No.: 216,444

[52] U.S. Cl.................................. 73/15.6, 73/100
[51] Int. Cl........................ G01n 3/20, G01n 25/00
[58] Field of Search...................... 73/15.6, 17, 100

[56] References Cited
UNITED STATES PATENTS

| | | | |
|---|---|---|---|
| 3,323,356 | 6/1967 | Arias.................................... | 73/100 |
| 3,665,751 | 5/1972 | Paine et al........................... | 73/15.6 |
| 2,892,342 | 6/1959 | Gross et al.......................... | 73/100 X |
| 2,931,220 | 4/1960 | Gordon................................ | 73/100 X |
| 2,495,746 | 1/1950 | Lubin................................... | 73/15.6 |
| 2,670,624 | 3/1954 | Faris, Jr. et al...................... | 73/100 |
| 3,187,556 | 6/1965 | Ehlers.................................. | 73/17 |

Primary Examiner—Herbert Goldstein
Attorney—Donovan J. De Witt et al.

[57] ABSTRACT

An instrument for determining polymer deflection temperatures, said instrument comprising a container holding an elongated sample of the polymer in a suspended position between its sample-supporting side walls, together with a plunger slidably engaged within said container and having a lower, wedge-shaped end which initially comes to rest against the undeflected sample in a position transverse to the longitudinal axis of the sample. A heater is employed to progressively elevate the temperature of the sample until the same deflects under the weight of the plunger, together with means associated with the plunger for signifying the resulting downward movement thereof and means for determining the temperature of the sample as this movement of the plunger occurs. In one embodiment, this downward movement of the plunger is detected by an electrobalance so arranged that a small suspended weight, spring-connected to the balance arm, is fully supported by the plunger as the latter rests against the nondeflected sample. This support is removed as the plunger moves downwardly with sample deflection, thereby causing a weight gain to be recorded by the electrobalance. The temperature of the sample at this point of weight gain is simultaneously read out from a thermocouple.

1 Claim, 2 Drawing Figures

United States Patent [19]
Martinelli
[11] 3,774,440
[45] Nov. 27, 1973
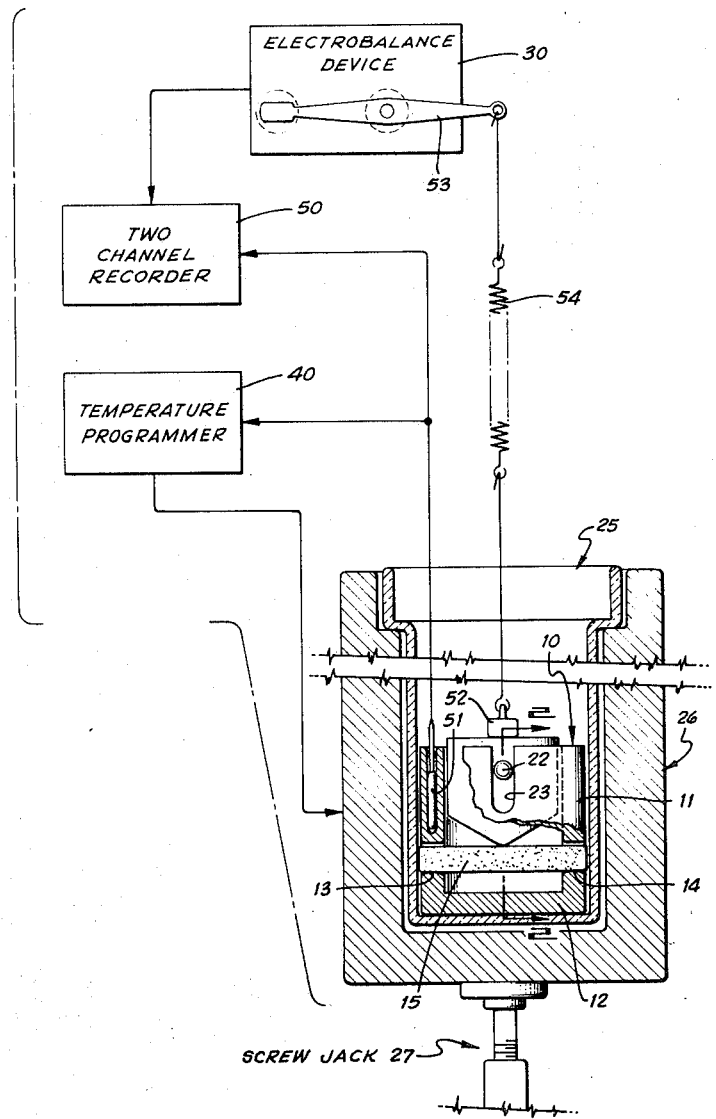

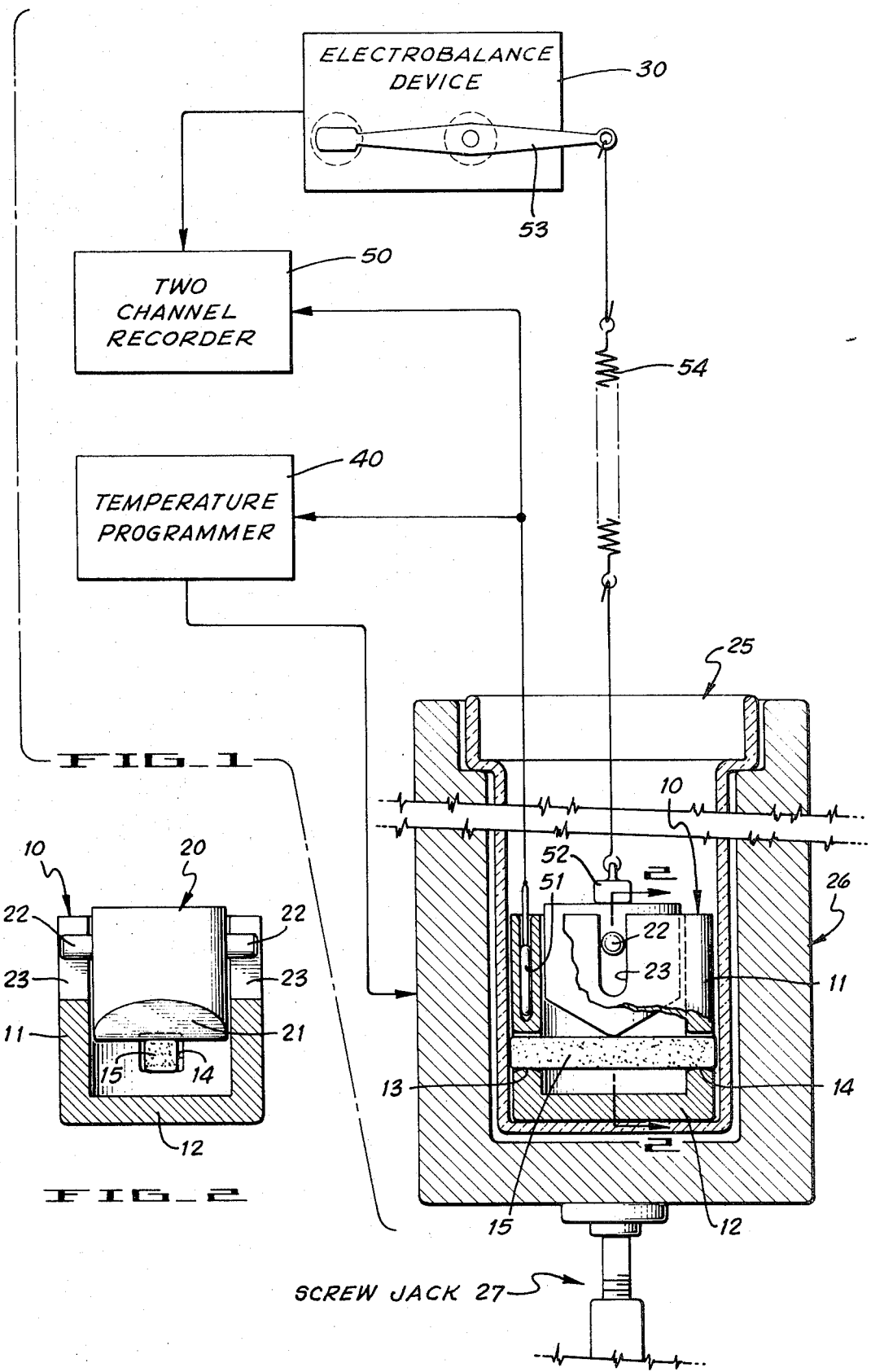

INSTRUMENT FOR DETERMINING POLYMER DEFLECTION TEMPERATURES

BACKGROUND OF THE INVENTION

The existing method for determining polymer deflection temperature, ASTM No. D648–56, requires a large (5 in. × ½ in.) sample which is immersed in an oil bath. The deflection temperature is taken to be the point at which the sample has deformed 0.01 in. under load. However, in this method the sample often swells in the oil and thus exhibits an erroneous deflection temperature. The present apparatus does away with this problem and, moreover, is adapted to employ small polymer samples such, for example, as about 1 in. × ⅛ in. × ⅛ in. Further, the present apparatus is adapted to provide a continuous record of the sample at various temperatures and is otherwise free of the practical temperature limitations implicit in the use of the oil bath method.

SUMMARY OF THE INVENTION

The present invention is concerned with an instrument for manifesting deflection of a polymer section which occurs as the section is heated to deflection temperature, the invention being more particularly concerned with apparatus of this character which can readily be adapted to provide automatic determination and recording of the temperature at which said deflection of the polymer section occurs.

The instrument of this invention comprises a hollow container, open at its top and provided with vertical side walls, together with a plunger which is slidably mounted within the container. Means are provided whereby an elongated section of the solid polymer under test can be carried in a bridging position across the container with the ends of said section being supported by the side walls. This can conveniently be accomplished by providing a pair of opposed apertures in the container walls through which the polymer section can be inserted, one end of the section thus resting against the bottom of the one aperture, while the other end is similarly supported within the opposite aperture.

The plunger element of the present instrument is shaped to engage the inner walls of the container in such a fashion as to readily slide downwardly therein under the influence of gravity. Thus, with a container having the shape of a hollow cylinder, the plunger can take a cylindrical piston-like configuration. The plunger has a wedge-shaped lower surface, and guide means are provided in order to set the leading edge of the wedge in a position transverse to the longitudinal axis of the supported polymer section. As an example of such guide means, the wall of the plunger may be provided with a boss which fits within a corresponding guide slot which is vertically cut into the wall of the container.

The present instrument is adapted to be heated in an oven, or the like, whereby the container-plunger assembly, and with it the inserted polymer section under test, is brought up to a temperature which softens the polymer section and thus allows the plunger to move downwardly in some measure within the container. This can conveniently be accomplished by placing the assembly in a Pyrex vessel which can then be lowered into the oven or other heating device employed.

The instrument of the present invention is also adapted to incorporate temperature indicating means such as a thermometer or a thermocouple positioned near the polymer section suspended in the container so as to indicate the true temperature of the polymer at the time deflection thereof occurs. This temperature means can either be fixed in place near the bottom of the container or, particularly in the case of a thermometer, it can be removably inserted whenever a test is to be made.

The downward movement of the plunger which signals that the polymer has reached the deflection temperature can be observed by the eye, with the operator then making the appropriate observation as to the polymer temperature. In a preferred embodiment of the invention, the plunger will be associated with indicating means triggered by the downward movement of the plunger for signifying that polymer deflection has occurred. In the more simple embodiments for signifying that the deflection temperature has been reached, said indicating means may be those capable of giving off a sensible signal such as a bell, light, or the like. In more elaborate embodiments the indicating means may include associated structure for bringing about the automatic recording of the polymer temperature at the precise time of polymer deflection.

In one embodiment of the present invention, which is that illustrated in the drawing, downward movement of the plunger is detected by an electrobalance so arranged that a small suspended weight, spring-connected to the balance arm, is fully supported by the plunger as the latter rests against the non-deflected sample. This support of the weight is removed as the plunger moves downwardly with sample deflection, thereby causing the balance to display and record a weight gain. Further, in this preferred embodiment of the invention the temperature of the sample at this point of weight gain is simultaneously read out from a thermocouple and recorded.

For a more complete understanding of the nature and objectives of the invention, reference may be had to the following detailed description taken in connection with the accompanying drawing wherein:

FIG. 1 is a partial sectional view of an instrument of the present invention in one embodiment thereof, with associated apparatus for recording plunger movement and the temperature of the polymer section under test being shown in a diagrammatic schematic fashion; and FIG. 2 is a sectional view taken along the line 2—2 of FIG. 1.

Referring now to the drawing, there is shown generally at 10 a hollow cylindrical container open at the top and having a wall 11 and a bottom 12. A pair of opposed apertures 13 and 14 in wall 11 serve to receive and support the respective ends of an elongated polymer test section 15 the deflection temperature of which is to be measured, it being seen that said section is suspended in a position which is well above the container bottom 12.

Slidably mounted within container 10 is a cylindrical plunger 20 having a wedge-shaped lower face 21 the leading edge of which comes to rest against the polymer section 15, said plunger 20 being provided on its side walls with bosses 22 which slidably engage within guide slots 23 cut in container wall 11. The relative positioning of the said bosses and guide slots is such as to bring the leading edge of the plunger face 21 into transverse engagement with respect to the longitudinal axis of the polymer test section 15, as shown in the drawing.

The container-plunger assembly, with the polymer section under test inserted therein, is shown as being carried within a Pyrex vessel 25 set, in turn, within an oven 26 adjustably supported by a jack 27.

The instrument of the present invention is shown in the drawing as being associated with an electrobalance 30 to detect downward movement of plunger 20 associated with polymer deflection, and with a temperature programmer 40 to control oven temperature. Also, the instrument is shown as associated with a 2-channel recorder 50 which continuously records both the temperature of the polymer section, as provided by a thermocouple 51 set in wall 11 of container 10, as well as a gain in weight manifested by the balance 30 as the plunger moves downwardly on deflection of the polymer. This showing of a weight gain is made possible by the indicated linkage wherein a small weight 52 (typically 1 g) is connected to arm 53 of the balance through a spring 54. This weight is supported by the plunger until the latter moves downwardly as the polymer deflects, thereby causing the balance to record a weight gain represented by the weight 52.

In operation, instrument hereof is set up for test with the plunger resting against the undeflected polymer section. The assembly of oven, Pyrex container and the container-plunger unit is then raised by jack 27 until weight 52 is supported and the tension on spring 54 is decreased to the point where the balance is nulled. The temperature of the furnace is then raised at a predetermined rate, as established by the temperature programmer 40, until the polymer section deforms under the load of the plunger. At this time the tension on spring 54 increases and this is manifested as a weight gain which is recorded by recorder 50 on a strip chart. Simultaneously, the temperature is also recorded by the device 50 as read out from the thermocouple 51 positioned very near the polymer section.

I claim:

1. An instrument for physically manifesting the point at which a polymer section deflects on being heated to progressively higher temperatures, said instrument comprising a hollow container, open at its top and provided with vertical side walls including means to support the respective ends of an elongated section of the polymer under test so as to maintain the same in a bridging position across the container, a plunger slidably engaged within the container and provided with a wedge-shaped lower face which comes to rest against the suspended polymer section with the leading edge of the wedge being substantially transverse thereto, said plunger being mounted to move downwardly in the container as the polymer reaches its deflection temperature and bends under the weight of the plunger, and sensing means to detect said downward plunger movement comprising a small weight resting atop the plunger, an electrobalance having an arm positioned above the plunger, and a spring connecting said arm and said weight, whereby downward movement of the plunger causes the weight to extend the spring and the electrobalance to record the resultant weight gain.

* * * * *